A. WARD, Jr. & T. P. CHASE.
AUTOMOBILE.
APPLICATION FILED JUNE 20, 1914.
1,169,058.
Patented Jan. 18, 1916.
2 SHEETS—SHEET 1.
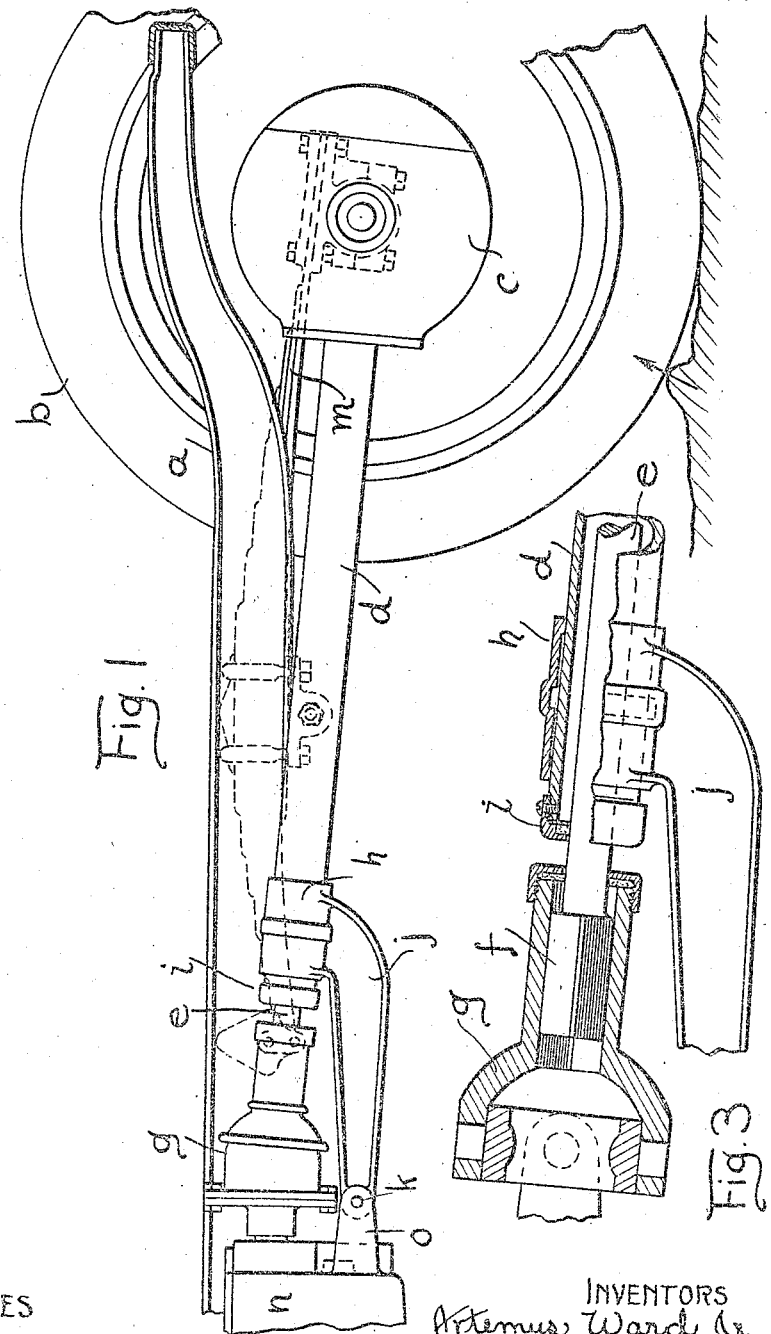
WITNESSES
INVENTORS
Artemus Ward Jr.
Theron P. Chase
BY
Ralzemond A Parker
ATTORNEY

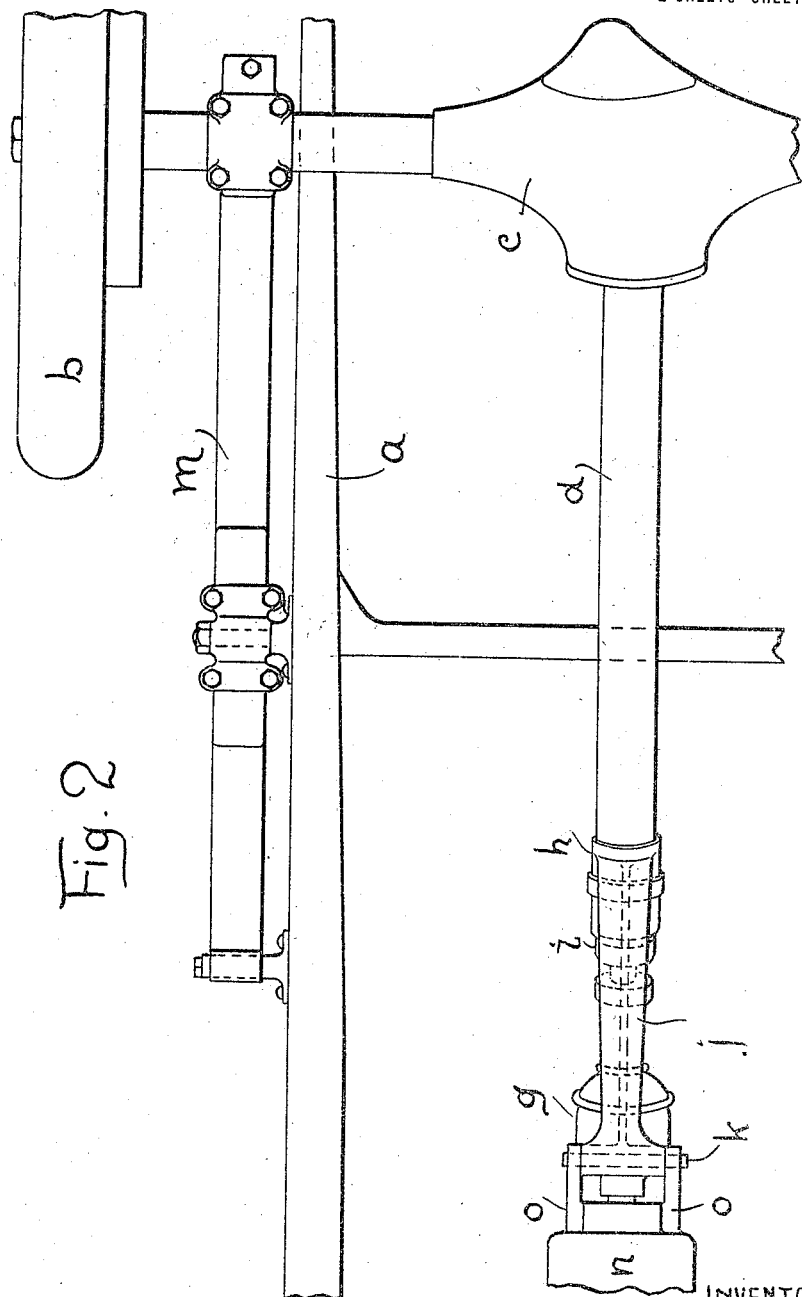

UNITED STATES PATENT OFFICE.

ARTEMUS WARD, JR., AND THERON P. CHASE, OF DETROIT, MICHIGAN, ASSIGNORS TO KING MOTOR CAR COMPANY, OF DETROIT, MICHIGAN, A CORPORATION OF MICHIGAN.

AUTOMOBILE.

1,169,058.  Specification of Letters Patent.  Patented Jan. 18, 1916.

Application filed June 20, 1914. Serial No. 846,230.

*To all whom it may concern:*

Be it known that we, ARTEMUS WARD, Jr., and THERON P. CHASE, citizens of the United States, residing at Detroit, county of Wayne, State of Michigan, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

Our invention relates to automobiles and has for its object to secure an improved running gear. We secure this object in the device illustrated in the accompanying drawings in which, Figure 1, is a side view of a part of an automobile embodying our invention. Fig. 2, is a plan view of the same, the apparatus being inverted. Fig. 3, is a detail view partly in section.

$a$ is a side piece of an automobile chassis and $b$ is one of the driving wheels.

$c$ is the casing for the rear axle and $d$ is the casing for the transmission shaft extending forwardly and upwardly from the axle casing $c$.

$e$ is the transmission shaft extending through the casing $d$ and terminating at its forward end in a squared portion $f$ which fits and is adapted to reciprocate longitudinally in a square socket in a part of the universal joint $g$.

$m$ is a cantaliver spring between the side piece $a$ and the rear axle casing $c$.

$h$ is a sleeve fitting and adapted to slide upon the transmission shaft casing $d$.

$i$ is a screw threaded nut or collar secured upon the forward end of the casing $d$ and adapted to limit the relative travel of the sleeve $h$ in that direction.

$n$ is a change speed gear casing.

$o$ $o$ are lugs extending rearwardly from the casing $n$.

$j$ is an arm integral at one end with the sleeve $h$ and extending forward and pivoted at its other end to the lugs $o$ $o$.

We desire to hold the parts in their proper relative position without in any way restraining the motion of the parts as controlled by the springs. We secure this object in the above described device, inasmuch as the slight forward and back movement of the casing $d$ relative to the chassis, as the latter moves up and down, is permitted by the movement of the sleeve upon the casing $d$, while the casing $d$ is always held in its proper position by said sleeve and the arm $j$.

In the possible contingency of the springs breaking the parts would still be held in position by the sleeve $h$ coming in contact with the collar $e$, and holding the casing $d$ in its proper relative angular position.

What we claim is:

In an automobile, a transmission shaft, a power shaft, said transmission shaft being connected to said power shaft by a universal joint, a casing for said transmission shaft, a sleeve fitting and adapted to slide longitudinally on said casing, an arm extending from said sleeve below the transmission shaft and having its end remote from said sleeve pivoted to a stationary support, below the pivot of the universal joint.

In testimony whereof, we sign this specification in the presence of two witnesses.

ARTEMUS WARD, JR.
THERON P. CHASE.

Witnesses:
 AGNES M. HIPKINS,
 ELLIOTT J. STODDARD.